United States Patent
Terry et al.

(10) Patent No.: US 7,849,335 B2
(45) Date of Patent: Dec. 7, 2010

(54) SYSTEM AND METHOD FOR PROVIDING A COMMUNICATION ENABLED UPS POWER SYSTEM FOR INFORMATION HANDLING SYSTEMS

(75) Inventors: Jared Terry, Austin, TX (US); Dhiraj Sehgal, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 768 days.

(21) Appl. No.: 11/559,777

(22) Filed: Nov. 14, 2006

(65) Prior Publication Data

US 2008/0114999 A1 May 15, 2008

(51) Int. Cl.
*G06F 1/26* (2006.01)
(52) U.S. Cl. ...................... 713/300; 713/340
(58) Field of Classification Search ................. 713/300, 713/310, 340, 320
See application file for complete search history.

(56) References Cited

U.S. PATENT DOCUMENTS

| | | | |
|---|---|---|---|
| 6,496,103 B1* | 12/2002 | Weiss et al. ................. | 375/257 |
| 7,254,016 B1* | 8/2007 | Strickland et al. ...... | 361/679.31 |
| 2001/0027479 A1* | 10/2001 | Delaney et al. ............. | 709/216 |
| 2004/0073817 A1* | 4/2004 | Liu et al. ..................... | 713/300 |
| 2004/0177283 A1* | 9/2004 | Madany et al. .............. | 713/300 |
| 2005/0028017 A1* | 2/2005 | Janakiraman et al. ....... | 713/340 |
| 2005/0229037 A1* | 10/2005 | Egan et al. .................... | 714/14 |
| 2006/0192434 A1* | 8/2006 | Vrla et al. ..................... | 307/64 |

* cited by examiner

*Primary Examiner*—Mark Connolly
*Assistant Examiner*—Paul B Yanchus, III
(74) *Attorney, Agent, or Firm*—Larson Newman & Abel, LLP

(57) ABSTRACT

A system and method for providing a communication enabled UPS power system for information handling system is disclosed. According to one aspect, an information handling system can be used to communicate with a power source using a first power cable. The information handling system can include a power circuit operable to power a portion of an information handling system using input power provided by an uninterruptible power supply (UPS). The information handling system can also include a UPS controller coupled to the power circuit. The UPS controller can control the output of the first UPS using a first power cable operable to provide the input power to power the portion of the information handling system.

20 Claims, 3 Drawing Sheets

SYSTEM AND METHOD FOR PROVIDING A COMMUNICATION ENABLED UPS POWER SYSTEM FOR INFORMATION HANDLING SYSTEMS

FIELD OF THE DISCLOSURE

This disclosure relates generally to information handling systems, and more particularly to a system and method for providing a communication enabled uninterruptible power supply (UPS) system for information handling systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

Various information handling systems can be provided as servers that allow for accessing and serving information, applications, and data to multiple clients connected via an Intranet, the Internet, or combinations thereof. Managing servers and server configurations has historically been accomplished by system administrators accessing terminals placed in close proximity to an actual server. System administrators could modify software, hardware, and other configurations using the terminal. Recent developments in server management includes providing remote management applications that allows system administrators to access server software, hardware, power management, and various other server components from a remote terminal. As such, system administrators can access various components or resources available to a server. However, the complexity of such applications and desire for access has increased the overall level of connectivity required within information handling systems. Therefore, what is desired is a solution that allows for increased access to system level components without requiring increases in hardware connections or interfaces within information handling systems and associated components.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
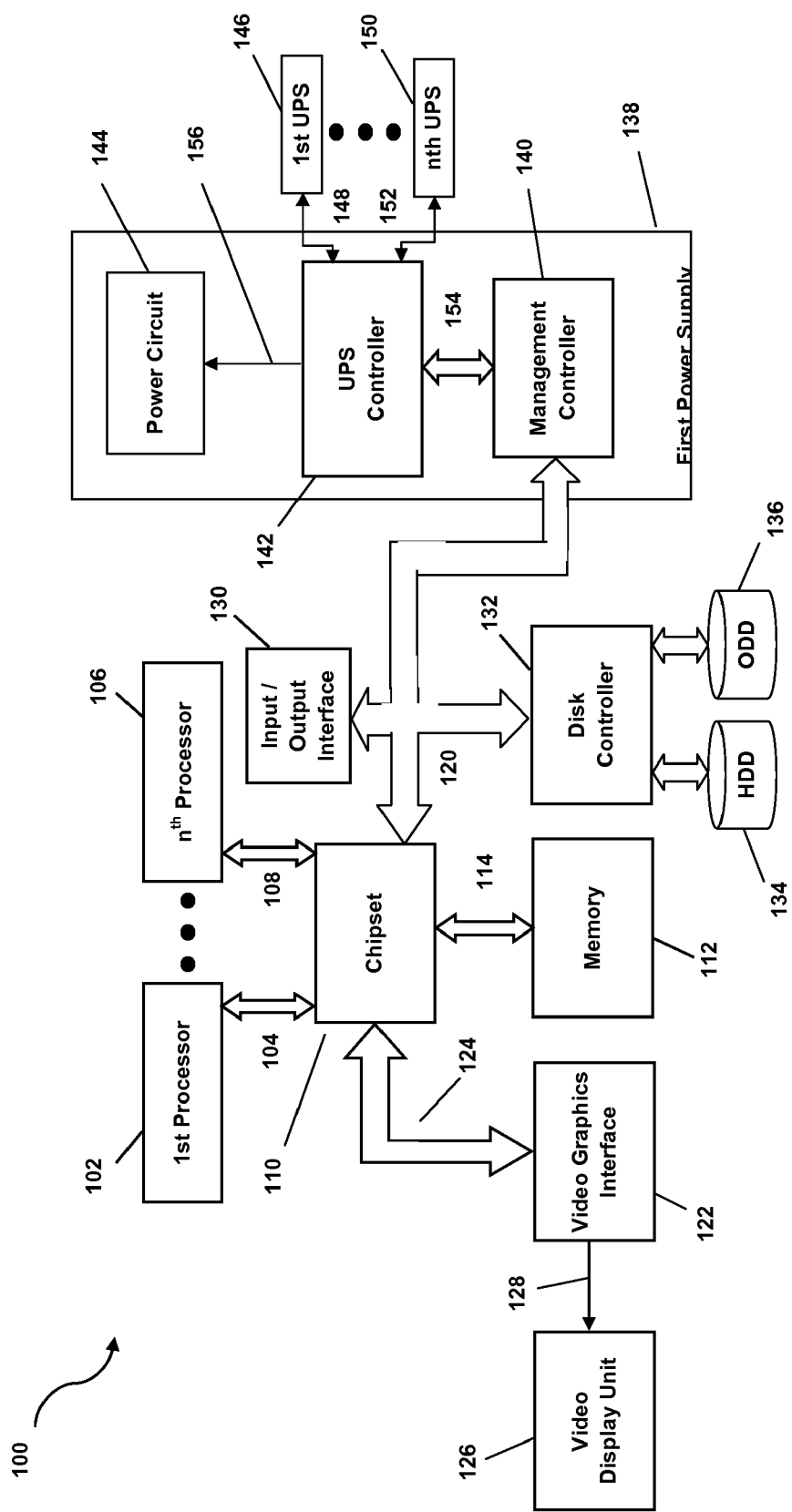
FIG. 1 illustrates a block diagram of an information handling system according to one aspect of the disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As indicated above, the following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. For example, much of the following focuses on information handling systems having printed circuit boards with quality verification test structures and methods for testing test structures. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

According to one aspect of the disclosure, an information handling system is disclosed. The information handling system can include a power circuit operable to power electronics within an information handling system using input power provided by an uninterruptible power supply (UPS). The information handling system can also include a UPS controller coupled to the power circuit. The UPS controller can control the output of the first UPS using a first power cable operable to provide the input power to power the electronics.

According to a further aspect of the disclosure, a method of managing power within an information handling system is provided. The method can include detecting connection of a UPS to a UPS controller of an information handling system. The method can further include receiving an initialization input power from the first UPS using a power cable coupled between the UPS and the UPS controller. The method can also include powering electronics of the information handling system using the initialization input power and enabling communication between the first UPS and the UPS controller using the first power cable to control the output of the first UPS.

According to a particular embodiment of the disclosure, an information handling system can include a first UPS communicatively coupled to the information handling system using a power cable. The power cable can be operable to provide input power and broadband-over-power to information handling system. The information handling system can further include a UPS controller coupled to the power cable. The UPS controller can include a communication enabled power interface operable to separate the input power and an inbound communication received from the first UPS and a power output module operable to output the input power to the electronics. The UPS controller can further include a communication module operable to output the inbound communication to a module responsive to the inbound communication. The information handling system can also include a system management controller operable to provide an input power requirement of the first UPS.

FIG. 1 illustrates a block diagram of an exemplary embodiment of an information handling system, generally designated at 100. In one form, the information handling system 100 can be a computer system such as a server. As shown in FIG. 1 the information handling system 100 can include a first physical processor 102 coupled to a first host bus 104 and can further include additional processors generally designated as n$^{th}$ physical processor 106 coupled to a second host bus 108. The first physical processor 102 can be coupled to a chipset 110 via the first host bus 104. Further, the n$^{th}$ physical processor 106 can be coupled to the chipset 110 via the second host bus 108. The chipset 110 can support multiple processors and can allow for simultaneous processing of multiple processors and support the exchange of information within information handling system 100 during multiple processing operations.

According to one aspect, the chipset 110 can be referred to as a memory hub or a memory controller. For example, the chipset 110 can include an Accelerated Hub Architecture (AHA) that uses a dedicated bus to transfer data between first physical processor 102 and the n$^{th}$ physical processor 106. For example, the chipset 110 including an AHA enabled-chipset can include a memory controller hub and an input/output (I/O) controller hub. As a memory controller hub, the chipset 110 can function to provide access to first physical processor 102 using first bus 104 and nth physical processor 106 using the second host bus 108. The chipset 110 can also provide a memory interface for accessing memory 112 using a third host bus 114. In a particular embodiment, the host buses 104, 108, and 114 can be individual buses or part of the same bus. The chipset 110 can also provide bus control and can handle transfers between the host buses 104, 108, 114.

According to another aspect, the chipset 110 can be generally considered an application specific chipset that provides connectivity to various buses, and integrates other system functions. For example, the chipset 110 can be provided using an Intel® Hub Architecture (IHA) chipset also that can include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 110. The chipset 110 can also be packaged as an application specific integrated circuit (ASIC).

The information handling system 100 can also include a video graphics interface 122 that can be coupled to the chipset 110 using fourth host bus 124. In one form, the video graphics interface 122 can be an Accelerated Graphics Port (AGP) interface to display content within a video display unit 126. Other graphics interfaces may also be used. The video graphics interface 122 can provide a video display output 128 to the video display unit 126. The video display unit 126 can include one or more types of video displays such as a flat panel display (FPD) or other type of display device.

The information handling system 100 can also include an input/output interface 130 that can be connected via the fourth host bus 120 to the chipset 110. The input/output interface 130 can include industry standard buses or proprietary buses and respective interfaces or controllers. The fourth host bus 120 can also include a Peripheral Component Interconnect (PCI) bus or a high speed PCI-Express bus. In one embodiment, a PCI bus can be operated at approximately 66 MHz and a PCI-Express bus can be operated at approximately 128 MHz. PCI buses and PCI-Express buses can be provided to comply with industry standards for connecting and communicating between various PCI-enabled hardware devices. Other buses can also be provided in association with, or independent of, the fourth host bus 120 including other industry standard buses or proprietary buses, such as ISA, SCSI, I2C, SPI, or USB buses.

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the memory 112, the fourth bus 120 operable as a PCI bus, and activities for the video graphics interface 122. The Northbridge portion can also communicate with the first physical processor 102 using first bus 104 and the second bus 108 coupled to the n$^{th}$ physical processor 106. The chipset 110 can also include a Southbridge portion (not illustrated) of the chipset 110 and can handle input/output (I/O) functions of the chipset 110. The Southbridge portion can manage the basic forms of I/O such as Universal Serial Bus (USB), serial I/O, audio outputs, Integrated Drive Electronics (IDE), and Industry Standard Architecture (ISA) I/O for the information handling system 100.

The information handling system 100 can further include a disk controller 132 coupled to the fourth bus 120. The disk controller 132 can be used to connect one or more disk drives such as a hard disk drive (ADD) 134 and an optical disk dive (ODD) 136 such as a Read/Write Compact Disk (R/W-CD), a Read/Write Digital Video Disk (R/W-DVD), a Read/Write mini Digital Video Disk (R/W mini-DVD), or other type of optical disk drive.

The information handling system 100 can also include a first power supply 138 that includes a management controller 140, a UPS controller 142, and a power circuit 144. Although illustrated as a single power supply, the information handling system 100 can include a plurality of power supplies as needed or desired. In one form, the UPS controller 142 can include a powerline modem operable to receive power while communicating information using a power cable. For example, the UPS controller 142 can be coupled to a first UPS 146 using a first power cable 148. The UPS controller 142 can also be coupled to an $n^{th}$ UPS 150 coupled using an $n^{th}$ power cable 152 as needed or desired. In one form, the first UPS 146 and the $n^{th}$ UPS 150 may include various types and sizes of UPSs and can be internal or external to the information handling system 100. In one form the first UPS 146 and the $n^{th}$ UPS 150 can be remote to the information handling system 100. According to one aspect, the first UPS 146 and $n^{th}$ UPS 150 can include a data port receptacle (not illustrated) operable to receive a data connector (not illustrated) for a data cable. Examples of a UPSs that can be employed by the information handling system 100 include a Smart-UPS, model number 3000 VA Dell™ and manufactured by APC, a Powerware® UPS model number PW5125-2880, or any other type of UPS that may be used by the information handling system 100.

In one form, the UPS controller 142 can also be coupled to a communication bus 154 operable to communicate with the management controller 140. The management controller 140 can be used to allow a system administrator access to one or more components or devices coupled to the information handling system 100 to monitor, and control access to, one or more components or devices. In one form, the communication bus 154 can be provided as a system control bus operable to communicate system control data between the UPS controller 142 and the management controller 140. For example, the management controller 140 may be used to access the first UPS 146 to determine one or more operating characteristics, power availability, or other types of information for managing the first UPS 146. The first UPS 146 may be a network addressable device and may include a machine access code (MAC) that may be accessed by the information handling system 100.

The UPS controller 142 can also provide a power output 156 that may be coupled to the power circuit 144 of the information handling system 100 to power various components or electronics of the information handling circuit 100. The power output 156 may be provided as one or more power connections, power planes, back planes, distribution lines, etc. that may be coupled to the power circuit 144 of the information handling system 100. In one form, the power circuit 144 can be used to distribute power to various components within the information handling system 100.

In one embodiment, the first power cable 148, the $n^{th}$ power cable 152, or any combination thereof, can include a broadband-over-power power cable. For example, the first power cable 148 can be provided as a broadband-over-power cable operable to provide input power to the information handling system 100 while enabling communication between the first UPS 146 and the information handling system 100. In one form, broadband-over-power technology can be used to provide a wired Ethernet local area network (LAN) between the information handling system 100 and the first UPS 146, the $n^{th}$ UPS 150, or any combination thereof. Broadband-over-power technology can allow for electrical current or input power to be provided using a standard power cable operable to communicate information using an Ethernet communication. In this manner, additional data cables may not be needed or desired to power the information handling system 100 when coupled to the first UPS 146 or the nth UPS 150. Additionally, the information handling system 100 can use Ethernet communication or other form of network communication to communicate with the first UPS 146, the nth UPS 150, or any combination thereof to access resources or input power.

During operation, the information handling system 100 can be coupled to the first UPS 146 using the UPS controller 142. For example, a user can switch on the first UPS 146 and can further turn on the information handling system 100 to power up the information handling system 100 using the first UPS 146. During initialization, the UPS controller 142 can communicate operating requests or operating parameters to the first UPS 146 via the first power cable 148. Additionally, the first UPS 146 can provide a low power output sufficient to enable a low power initialization of the information handling system 100. In one form, a low power initialization may include providing minimal power to select components within the information handling system 100. During initialization, the UPS controller 142 can receive input power from the first UPS 146, and can further communicate power requests or input parameters to the first UPS 146 to determine a power availability of the first UPS 146 for a full power operation of the information handling system 100. Availability during other operating conditions may also be determined.

In one embodiment, the first processor 102, the nth processor 106, the management controller 140, or any combination thereof, can be used to determine power requirements of each component within the information handling system 100, and can provide one or more power requirements or operating parameters to the UPS controller 142 to communicate to the first UPS 146. The power requirements or operating parameters can be communicated to the first UPS 146 via the first power cable 148 during receipt of initialization power from the first UPS 146. The first UPS 146 can determine a response to the operating parameter's requests and communicate accordingly. For example, if the first UPS 146 has sufficient capacity to meet the running power requirements for the information handling system 100, the first UPS 146 can communicate a response to the UPS controller 142 indicating sufficient power can be provided by the first UPS 146. In one form, the first UPS 146 may not be able to provide sufficient power. As such, the UPS controller 142 can communicate a second request including one or more parameters to a second UPS (not illustrated), such as the $n^{th}$ UPS 150, to determine if all or portions of the power may be provided.

According to another aspect, the UPS controller 142 may communicate a failover power level parameter to the first UPS 146 using the first power cable 148. For example, a failover power level requirement may be communicated to the first UPS 146, the $n^{th}$ UPS 150, or any combination thereof, to determine an upper end power availability or capacity limit in the event of failure the first UPS 146, $n^{th}$ UPS 150, another UPS, or any combination thereof. For example, the first UPS 146 can be used to power the information handling system 100 and if the first UPS 146 fails or becomes inoperable, a failover parameter can be communicated to another UPS to determine an availability and power capacity in the event the first UPS 146 fails. In this manner, the UPS controller 142 can locate an available UPS as needed or desired.

Figure 2:
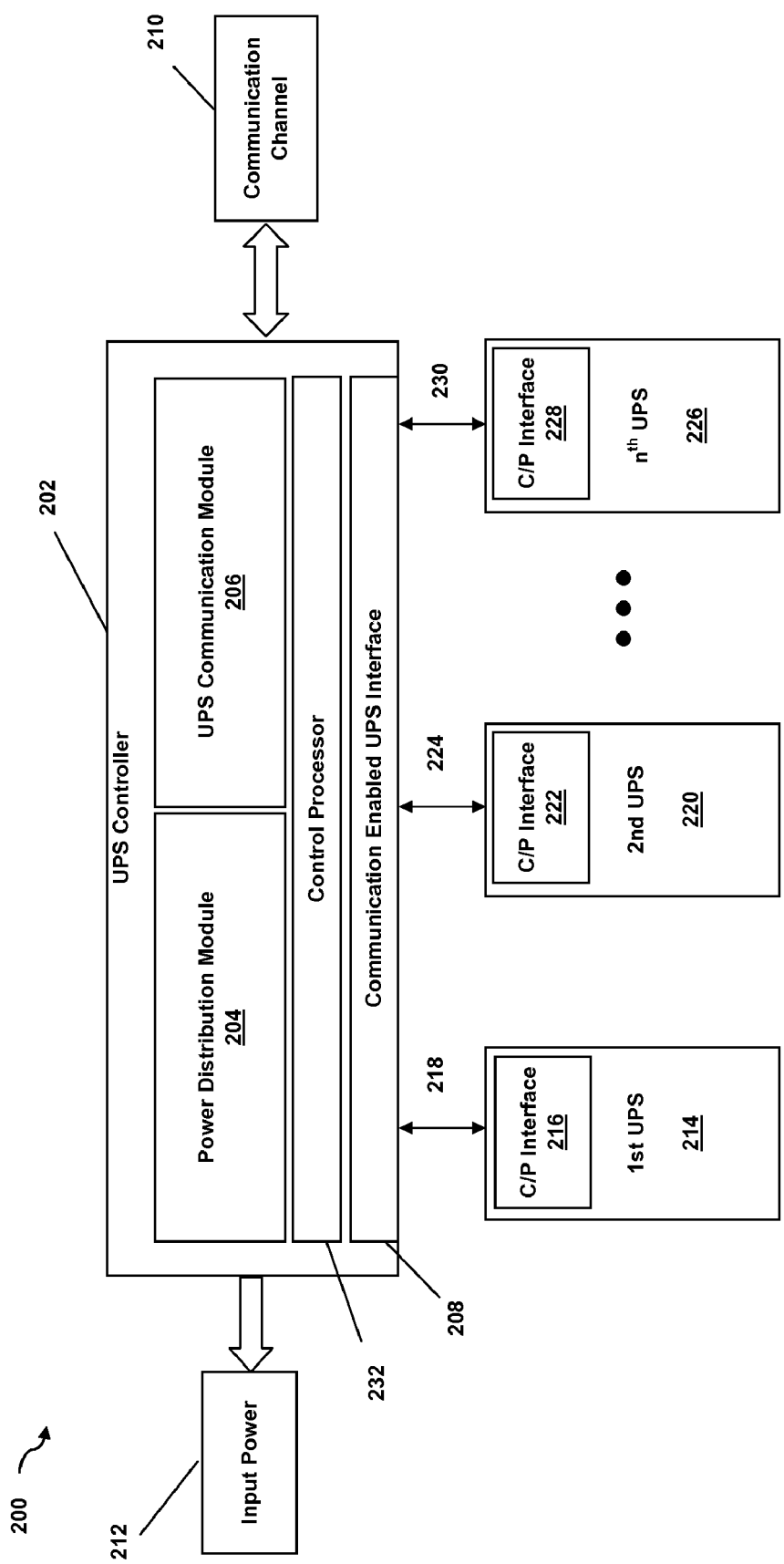
FIG. 2 illustrates a functional block diagram of communication-enabled power system for use within an information handling system according to another aspect of the disclosure.

FIG. 2 illustrates a functional block diagram a communication-enabled power system, generally depicted at 200, according to one aspect of the disclosure. The communication-enabled power system 200 can be employed by the information handling system 100 illustrated in FIG. 1 or other types of information handling systems that can benefit from one or more feature or function of the communication-enabled power system 200. In one form, portions or all of the communication-enabled power system 200 can be provided internal to an information handling system or may be provided as an external module or device that may be coupled to an information handling system.

According to one aspect, the communication-enabled power system 200 can include a UPS controller 202, such as a powerline modem, that includes a power distribution module 204, a UPS communication module 206, a communication-enabled UPS interface 208, and a control processor 232. In one form, the UPS controller 202 can be a broadband Ethernet enabled power distribution controller or a broadband over power enabled controller. The communication-enabled power system 200 can be coupled to a portion of an information handling system such as a communication bus or other type of communication medium operable to provide a communication channel 210 for communicating information between the UPS controller 202 and an information handling system such as information handling system 100 described in FIG. 1. In one form, the information handling system may include a processor, management controller, application, or any combination thereof operable to be coupled to the communication channel 210. According to one aspect, the communication channel 210 may be used to receive and send communications to the UPS controller 206 operably coupled to the communication-enabled UPS interface 208. The UPS controller 202 further includes the power distribution module 204 operable to couple input power 212 to one or more input power circuits of the information handling system for powering various components or electronics within the information handling system.

According to one aspect, the communication-enabled power system 200 can include a first UPS 214 including a first communication and power (C/P) interface 216 operable to be coupled to the UPS controller 202 using a first power cable 218. Additional UPSs may also be provided in association with the communication-enabled power system 200. For example, the communication-enabled power system 200 can further include a second UPS 220 including a second C/P interface 222 that can be operably coupled to the communication-enabled UPS interface 208 using a second power cable 224. Numerous additional UPSs may be coupled to the communication-enabled UPS interface 208 as illustrated generally as $n^{th}$ UPS 226 including an associated $n^{th}$ C/P interface 228 that can be coupled to the communication-enabled UPS interface 208 using an $n^{th}$ power cable 230.

In one embodiment, each UPS may be connected as needed or desired to provide the input power 212 to power an information handling system. Each UPS can include operating characteristics such as a maximum power rating, voltage output rating, current output rating, load rating, and other operating characteristics. In one embodiment, one or more UPS can include more than one output to provide power to more than one information handling system, server, or other type of electronic device, system, or component. As such, each UPS may include more than one broadband-over-power port that can be operable to couple additional power lines capable of data communication.

According to one aspect, each UPS can be addressable by the UPS controller 202 and may be provided as a part of a local area network provided when connecting the UPSs to the communication-enabled UPS interface 208. In one form, a management control system of an information handling system and can be used to remotely control one or more UPS. Additionally, each UPS may include a C/P interface that includes logic to communicate with the UPS controller 202 or other controllers while providing input power 212 to the information handling system using a power cable. According to one aspect, each UPS may include firmware, a driver, or other encoded logic that can be operably associated with the UPS controller 202. For example, each C/P interface may include encoded logic that may be used to assist with controlling the input power and communication between the UPS controller 202. The encoded logic may be provided within a memory of a C/P interface or UPS and executed by each UPS when used in association with the UPS controller 202. Additionally, the UPS controller 202 can include encoded logic that may access or provided in association with the control processor 232 of the UPS controller 202. The encoded logic can be provided in association with encoded logic of a C/P interface and can allow for providing a common interface, protocol, or logic for communicating information, controlling operation of each UPS, accessing operating characteristics of each LIPS, enabling or disabling each UPS, etc.

During operation, the input power 212 can be provided by one or more UPSs coupled to the UPS controller 202 and operable to power an information handling system. For example, the input power 212 can be provided by the first UPS 214 and the first C/P interface 216 using the first power cable 218 coupled to UPS controller 202. The communication-enabled UPS interface 208 of the UPS controller 202 can receive the first input power provided by the first UPS 214 and the first input power may be coupled to the power distribution module 204 and distribute the power as the input power 212 to the information handling system. In other embodiments, the UPS controller 202 may receive plural power inputs from more than one UPS. As such, the UPS controller 202 and the power distribution module 204 may be operable to aggregate input power provided by more than one UPS and couple aggregated power to provide the input power 212 as desired.

In one form, the UPS controller 202 may communicate with the first UPS 214 during initialization of an information handling system. The UPS controller 202 may communicate a request including a desired input power level to the first UPS 214 using the first power cable 218. The first UPS 214 may receive the communication including the request using the first C/P interface 216 and determine if the first UPS 214 can provide the requested power level. The first UPS 214 can communicate a response to the UPS controller 202 using the first power cable 218 indicating whether the desired power level can be provided. In one form, the first UPS 214 may be providing a first input power to the UPS controller 202 while the request may be communicated to the first UPS 214. The UPS controller 202 may detect the response from the first UPS 214 using the communication-enabled UPS interface 208 and can couple the response to the UPS communication module 206 or process the request using the control processor 232. In one form, the UPS communication module 206 can couple the response to the communication channel 210 if desired. Upon receiving the response, the UPS controller 202 may process the response and enable use of the first UPS 214. However, if the first UPS 214 may not be able to provide the desired input power level, the UPS controller 202 may communicate the request to an additional UPS to determine if the input power level can be provided. For example, in one embodiment, the UPS controller 202 may broadcast the request to multiple UPSs and receive and process multiple responses to determine if the desired input power level may be met.

In one form, the UPS controller 202 can communicate an additional signal to the first UPS 214 to monitor an operating condition of the first UPS 214 or to request additional power. For example, the first UPS 214 may become inoperable while providing input power to the UPS controller 202 using the first power cable 218. In some forms, the first UPS 214 may become inoperable, overheat, or loose power. The UPS controller 202 may determine an availability of input power from another UPS and couple input power from another UPS to the information handling system. For example, the UPS controller 202 may communicate a request to the second UPS 220 to determine a power availability. The second UPS 220 may respond to the request by providing the input power or increase an existing output power level to maintain power during operation of the information handling system. In this manner, the input power 212 can be provided using one or more UPS coupled to the UPS controller 202.

According to one aspect, the communication-enabled UPS interface 208 can include a filter circuit operable to filter the input power signal from a communication signal. For example, in one embodiment the first UPS module 214 can include both a power signal and a communication signal using the same conductors or medium. As such, a communication signal can be filtered from the power signal using a filter provided within the communication-enabled UPS interface 208. Other forms of providing a communication signal and input power using a power cable may also be employed including, but not limited to, modulation, phase shifting, encoding, etc. or any combination thereof.

In one embodiment, each UPS can be a "plug and play" UPS similar to USB technology. For example, an additional or replacement UPS can be coupled to the UPS controller 202 and the UPS controller 202 can auto detect the broadband over power enabled UPS using a circuit verification (e.g. resistive element verification) or other form of validation. In this manner, additional capacity can be added without having to power down an information handling system or place in another state. For example, the communication-enabled UPS interface 208 can be operable to detect a coupling of a new UPS and may determine one or more operating parameters for the new UPS. For example, one or more parameters or operating characteristics may be communicated between the newly connect UPS to determine operating characteristics or operating capabilities of the new UPS. In this manner, the UPS controller can employ the new UPS based on the available resources of the new UPS and can alter one or more outputs of a previously connected UPS module if needed. For example, an output power level of a currently connected UPS may be lowered and the newly connected UPS may provide an input power level to ensure the difference is provided. In another embodiment, the newly connected UPS may be kept as a reserve UPS that can be used when a failsafe or failover condition occurs. When a failsafe or failover condition occurs, the UPS controller 202 can then request an increase in output of the newly connected UPS to account for the power that may be lost due to the failsafe or failover condition.

Figure 3:
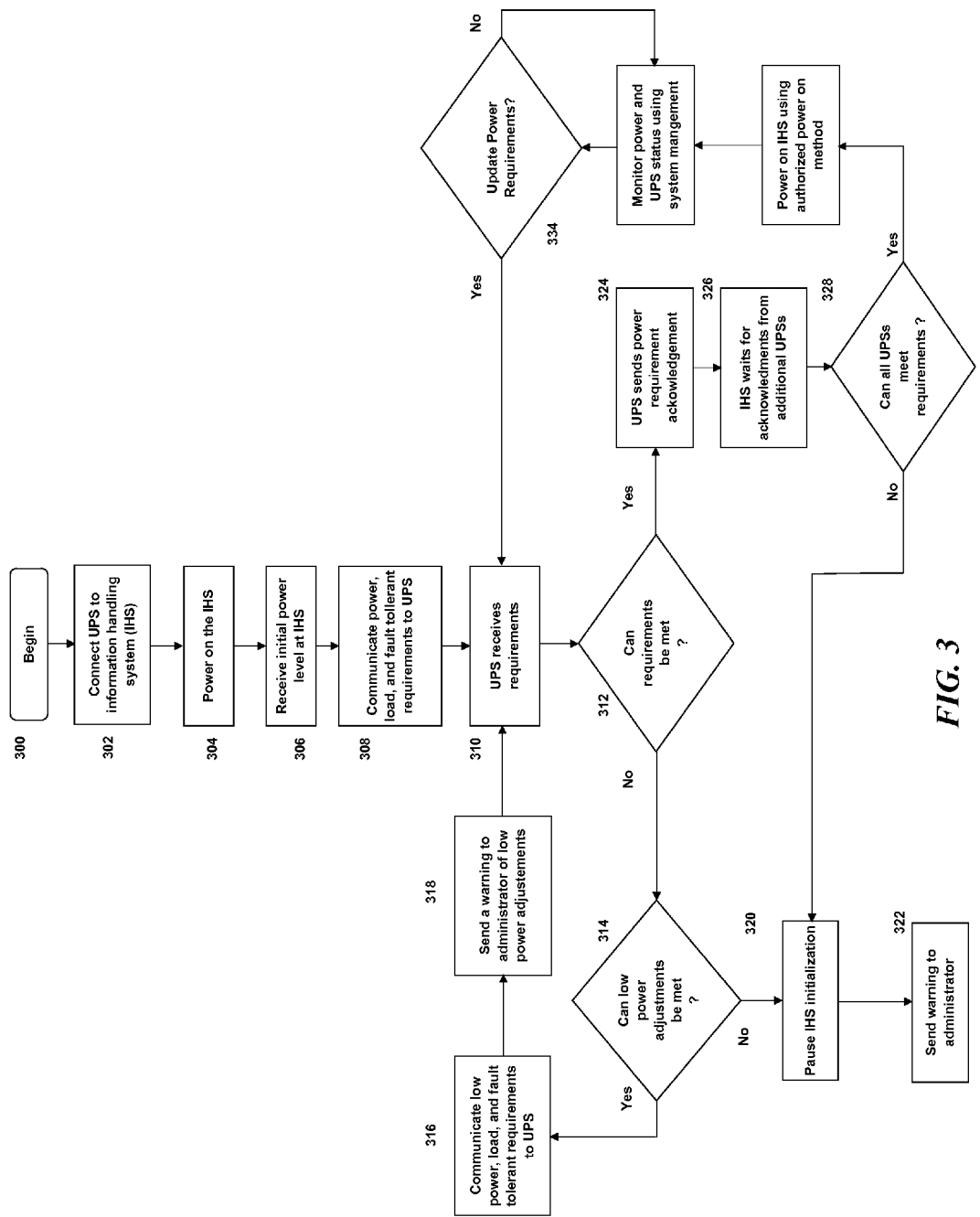
FIG. 3 illustrates a flow diagram of a method for powering an information handling system using a UPS and associated power cable according to a one aspect of the disclosure.

FIG. 3 illustrates a flow diagram of a method for powering an information handling system using a UPS and associated power cable according to one aspect of the disclosure. The method of FIG. 3 can be employed in whole or in part by the information handling system 100 depicted in FIG. 1, the communication-enabled power system 200 illustrated in FIG. 2, or any other type of information handling system operable to employ the method of FIG. 3. Additionally, the method can be embodied in various types of encoded logic or digital mediums including software, firmware, hardware, or other forms of digital storage mediums or logic, or any combination thereof, operable to provide all or portions of the method of FIG. 3.

The method begins generally at block 300. At block 302, a UPS can be connected to an information handling system (IHS). At block 304, the IHS can be powered on and at block 306, an initial power level can be received by the IHS from the UPS. For example the initial power level can be a reduced or low power level sufficient to initialize the IHS. The initial power level can be received using a broadband-over-power power cable operable to provide input power and a communication signal. Upon receiving the initial power, the method proceeds to block 308 and the IHS communicates performance requirements or operating parameters to the UPS using the broadband-over-power power cable. For example, the IHS can communicate power, load, and fault tolerant requirements to the UPS. For example, fault tolerant requirements can account for the number of attached power supplies and UPSs available, and a maximum expected draw that can be expected if failure occurs. Similarly, a load requirement can include a maximum load requirement that can be placed on a UPS to sufficiently power to the IHS. For example, the load requirement can be based on a maximum expected performance of the IHS when maximum power may be consumed. If more than one UPS may be used to provide input power, the requirements placed on a specific UPS may vary. In some forms, the IHS can communicate other power requirements such as initialization power requirements, ruing or normal operating power requirements, failover power requirements, or any combination thereof. Other power requirements or parameters can also be communicated by the IHS to the UPS as needed or desired.

At block 310, the UPS receives the requirements or parameters communicated by the IHS, and at decision block 312, the UPS determines if the requirements can be met. If the requirements cannot be met, the method proceed to decision block 314 and determines if low power adjustments can be made by the IHS for the UPS to meet low power requirements. For example, a low power adjustment can include altering the requirement slightly to meet the requirements requested by the IHS. In one form, alteration of power requirements can include powering critical components of the IHS instead of powering the entire IHS. powering entire system only the mission critical marked components would be powered. For example, select cards, devices, drives, etc. may not be powered.

If low power adjustments can be made, the method proceeds to block 316 and low power, load, and fault tolerant requirements can be communicated to the UPS. The method then proceeds to block 318 and a warning can be sent to the system administrator to notify or indicate that a low power adjustment has been made for the specific UPS. The method then proceeds to block 310 and continues.

In one form, if at decision block 314 a low power adjustment cannot be met, the method proceeds to block 320, and pauses initialization of the IHS. For example, if the UPS cannot provide sufficient operation provided by the requirements, initialization of the IHS can be paused. The method can then proceed to block 322 and a warning message can be sent to a system administrator. For example, an email, text message, instant message, page, beep code, LCD display message etc. can be communicated to the system administrator to alert the system administrator that initialization of the IHS has been paused, and that power requirements, failover requirements, or both cannot be met.

In one embodiment, at decision block 312 if the requirements can be met by the UPS, the method proceeds to block 324, and the UPS communicates an acknowledgement to the IHS using the broadband-over-power power cable connected between the IHS and UPS. The method then proceeds to block 326, and the IHS waits for acknowledgments from additional UPSs. For example, the IHS can be coupled to more than one UPS and, upon receiving an acknowledgement from any additional UPSs, the method can proceed to decision block 328. At decision block 328, the method determines if all of the UPSs can meet the requirements. In one form, if all of the UPSs cannot meet the requirements, the method proceeds to block 320 and pauses initialization of the IHS. The method then continues to block 322 and sends a warning to the system administrator. In another embodiment, if some of the UPSs can meet the requirements, the method can proceed to step 330. Additionally, a message can be sent to the administrator indicating that at least one of the UPSs could not meet the requirements and the requirements may be adjusted to safeguard from overloading the remaining UPSs that can be used to power the IHS.

If at decision block 328, the UPSs can meet the requirements, the method proceeds to block 330 and the IHS can be powered on using the authorized power on method and power provided by the UPSs using the broadband-over-power power cables. For example, the IHS can receive an acknowledgement from the UPSs indicating that the UPSs can supply the required power. Upon receiving the acknowledgements, the UPSs can respond to a UPS controller associated with a specific UPS, and allow the IHS to power on using the specific UPS and the previously communicated power requirements.

Upon powering on the IHS, the method proceeds to block 332 and monitors power and an operating status of the UPS using the system management of the IHS. For example, the system management can communicate operating status requests to the UPS using the broadband-over-power power cable, and the UPS can communicate an operating status. In one embodiment, during monitoring, operating parameters can be periodically communicated from the UPS using the power cable connected to the UPS controller while the UPS may be providing an input power. The UPS controller may then provide the performance parameters to a management controller operable to monitor performance of the UPS. For example, an increase in output power requirements of the UPS may be placed on the UPS due to performance demands of the IHS. As such, an operating parameter of the UPS may be communicated to the UPS to determine if the performance demand can be met.

At decision block 334, the IHS determines if a power requirement should be updated. For example, the IHS may need an increase or decrease in power consumption. As such, if a power requirement should be updated, the method proceeds to block 310 and continues. If at decision block 334, the IHS determines that a power requirement does not need updating, the method proceeds to block 332 and repeats.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An uninterruptible power supply (UPS) controller comprising:
   a power output module operable to couple input power received from a first UPS to an information handling system; and
   a communication enabled power interface operable to receive the input power from the UPS using a first power cable coupled to the first UPS, the communication enabled power interface further operable to separate the input power and a communication received from the first UPS, to broadcast a maximum power availability request to a plurality of UPSs including the first UPS, to receive a response to the maximum power availability request from each of the plurality of UPSs, to determine, in response to the maximum power availability request, whether the information handling system can make a low power adjustment, if the information handling system cannot make the low power adjustment, pausing an initialization of the information handling system, and sending a warning message indicating that the initialization of the information handling system is paused, and otherwise, completing the initialization of the information handling system.

2. The UPS controller of claim 1, further comprising the communication enabled power interface operable to communicate a parameter to the first UPS using the first power cable.

3. The UPS controller of claim 1, further comprising:
   the power output module operable to be coupled to the communication enabled power interface; and
   a communication module coupled to the communication enable power interface and operable to couple an inbound communication received from the first UPS to a system management controller.

4. The UPS controller of claim 3, wherein the communication enabled power interface is operable as a broadband over power interface.

5. The UPS controller of claim 1, wherein the first UPS further includes an output power interface operable to provide the input power while receiving an outbound communication from the communication enabled power interface.

6. The UPS controller of claim 5, wherein the first UPS further includes a UPS device driver operably associated the communication enabled power interface and operable to control the input power provided by the first UPS.

7. The UPS controller of claim 1, wherein the communication enabled power interface is operable to send an outgoing communication to a first UPS while receiving the input power from the first UPS using the first power cable.

8. The UPS controller of claim 7, wherein the input power includes an initialization power level to power a portion of the information handling system and the outgoing communication includes a maximum power level value request.

9. The UPS controller of claim 7, wherein the communication enabled power interface is further operable to receive a maximum power level from the first UPS and a status communication from the first UPS using the first power cable.

10. The UPS controller of claim 1, further comprising:
    the first UPS operable to provide the input power and a power level capacity availability to the communication enabled power interface using the first power cable; and
    a system management controller operably coupled to the communication enabled power interface, the system management controller operable to compare the power level capacity availability to a required power level of the information handling system.

11. The UPS controller of claim 10, further comprising:
    the system management controller further operable to determine an insufficient power level associated with the first UPS;
    a second UPS operably coupled to the communication enabled power interface using a second power cable, the second UPS responsive to an availability request provided using the second power cable; and
    the system management controller operable to initiate use of the second UPS to power the portion of the information handling system.

12. A method of providing power within an information handling system, the method comprising:
    detecting a connection of a first uninterruptible power supply (UPS) to a UPS controller of an information handling system;

receiving an initialization input power from the first UPS using a first power cable coupled between the first UPS and the UPS controller;

powering a portion of the information handling system using the initialization input power;

enabling communication between the first UPS and the UPS controller using the first power cable to control the output power of the first UPS;

broadcasting a maximum power availability request to a plurality of UPSs including the first UPS;

receiving a response to the maximum power availability request from each of the plurality of UPSs;

determining, in response to the maximum power availability request, whether the information handling system can make a low power adjustment;

if the information handling system cannot make the low power adjustment, pausing an initialization of the information handling system, and sending a warning message indicating that the initialization of the information handling system is paused; and otherwise, completing the initialization of the information handling system.

13. The method of claim 12, further comprising:

determining the maximum power level to power the portion of the information handling system; and determining an availability of the maximum power based on a response from the first UPS, the response received with the initialization input power using the first power cable.

14. The method of claim 13, further comprising:

determining an unavailable power level based on the response received from the first UPS.

15. The method of claim 14, further comprising:

determining the maximum input power level is available from the second UPS;

enabling access to the second UPS; and disabling access to the first UPS.

16. The method of claim 12, further comprising:

providing an operating parameter to communicate to the first UPS;

communicating an operating parameter request to the first UPS;

receiving a response to the operating parameter request from the first UPS; and enabling use of the first UPS based on the response to the operating parameter request.

17. The method of claim 16, wherein the operating parameter includes a payload input power requirement operating parameter.

18. The method of claim 16, wherein the operating parameter includes a fail over power requirement operating parameter.

19. An information handling system comprising:

a first uninterruptible power supply (UPS) communicatively coupled to an information handling system using a first power cable operable to provide input power to power a portion of the information handling system;

a UPS controller coupled to the power cable, the UPS controller including:

a communication enabled power interface operable to separate the input power and an inbound communication received from the first UPS using the first power cable, to detect a new coupling of a second UPS, to determine operating parameters for the second UPS, and to alter the input power from the first UPS based on an available resource of the second UPS;

a power output module operable to output the input power to the portion of the information handling system; and a communication module operable to output the inbound communication; and a system management controller operable to determine an input power request to broadcast to a plurality of UPSs including the first UPS, to receive a response to the input power request from each of the plurality of UPSs, to determine, in response to the input power request, whether the information handling system can make a low power adjustment, if the information handling system cannot make the low power adjustment, pausing an initialization of the information handling system, and sending a warning message indicating that the initialization of the information handling system is paused, and otherwise, completing the initialization of the information handling system.

20. The system of claim 19, wherein:

the first UPS is further operable to determine a power availability in response to receiving the input power request;

the first UPS is further operable to communicate the response to the UPS controller using the power cable; and the management controller is further operable to determine an availability of a second UPS based on the response.

* * * * *